United States Patent

[11] 3,614,413

[72] Inventor David E. Beach
Rochester, N.Y.
[21] Appl. No. 813,420
[22] Filed Apr. 4, 1969
[23] Division of Ser. No. 765,926, Oct. 8, 1968.
[45] Patented Oct. 19, 1971
[73] Assignee Sylvania Electric Products Inc.
Danvers, Mass.

[54] PERCUSSION ACTIVATABLE FLASH UNITS HAVING INDIVIDUAL STRIKER ELEMENTS
5 Claims, 8 Drawing Figs.
[52] U.S. Cl. .................................................. 240/1.3,
95/11 L, 431/93
[51] Int. Cl. .......................................... G03b 15/02
[50] Field of Search ........................................... 95/11 L;
240/1.3, 37.1; 431/92, 93, 94, 95

[56] References Cited
UNITED STATES PATENTS
2,091,601 8/1937 Leijdens ...................... 431/93
3,508,478 4/1970 Brooks ........................ 240/1.3 X
FOREIGN PATENTS
635,443 9/1936 Germany ..................... 431/93

Primary Examiner—Samuel S. Matthews
Assistant Examiner—Fred L. Braun
Attorney—Joseph C. Ryan ABSTRACT: A percussion-ignitable multilamp photoflash unit in which individual spring striker elements for each lamp of the unit are held in a preenergized condition. Access openings are provided in the base of the flash unit at positions such that an actuating mechanism in photographic apparatus on which the units are detachably mounted can cooperate to selectively release the striker elements in the flash unit.

DAVID E. BEACH
INVENTOR.
ATTORNEYS

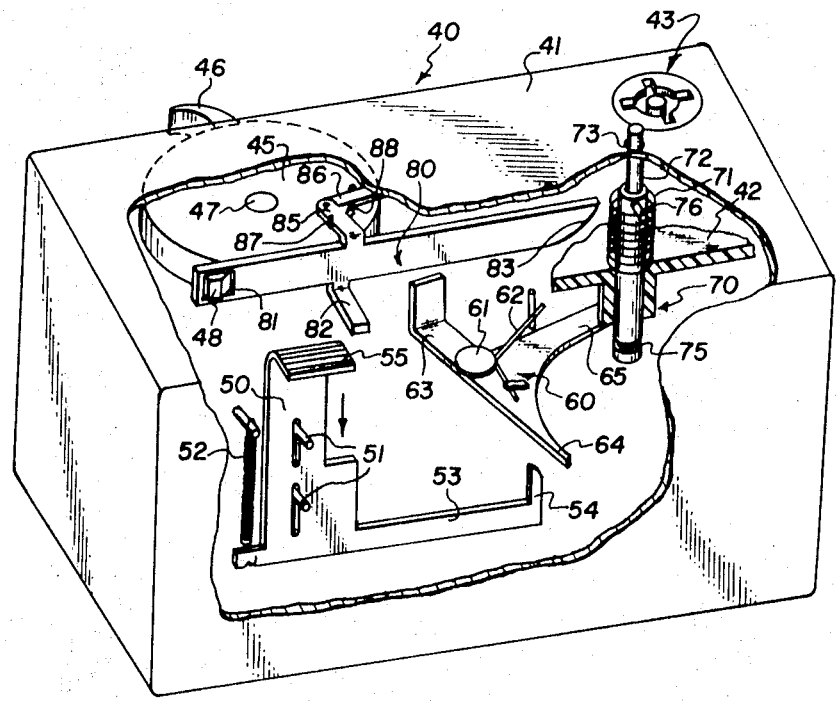
FIG. 6
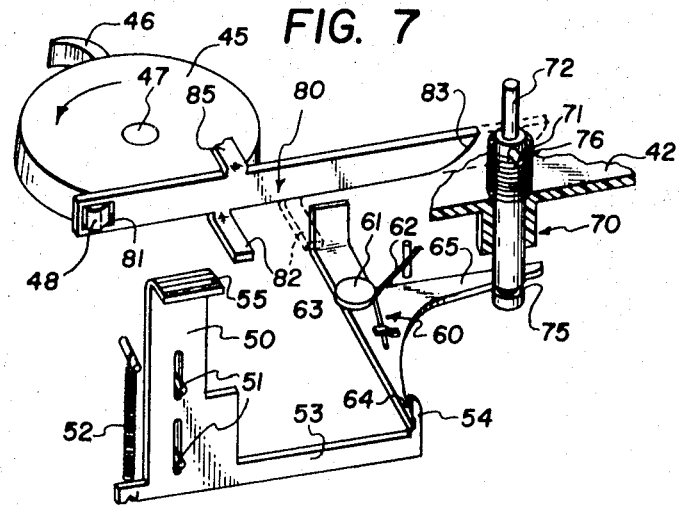
FIG. 7
FIG. 8
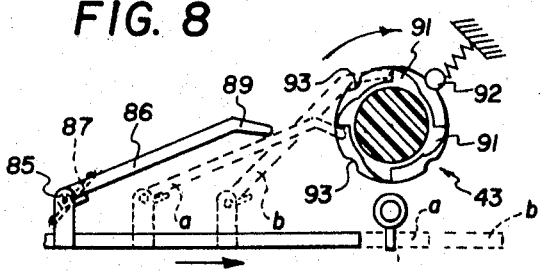
DAVID E. BEACH
INVENTOR.
BY J. Addison Matthews
Robert W. Hampton
ATTORNEYS

PERCUSSION ACTIVATABLE FLASH UNITS HAVING INDIVIDUAL STRIKER ELEMENTS

This application is a division of U.S. application Ser. No. 765,926, entitled "Percussion Activatable Flash Units Having Individual Striker Elements and Photographic Apparatus For Using Such Units," filed Oct. 8, 1968, in the name of David E. Beach.

CROSS-REFERENCE TO RELATED APPLICATION

Reference is made to commonly assigned copending U.S. application Ser. No. 765,930, entitled "Multilamp Flash Unit," filed Oct. 8, 1968, in the name of David E. Beach.

BACKGROUND OF THE INVENTION

1. Field of the Invention

The present invention relates to flash photography and in particular to flash units having percussion-activatable flashlamps and percussion striking elements.

2. Description of Prior Art

In the field of flash photography, a disposable, transparent-walled package containing a plurality of electrically activatable photoflashlamps and individual reflectors for each flashlamp has been developed for use with photographic apparatus. Such a flash unit is disclosed in U.S. Pat. No. 3,244,087. This type of disposable multilamp package provides many advantages such as convenience of use and safety in operation and has therefore been well accepted commercially.

However, multilamp photoflash units of the type described above require an electrical source and connecting circuit for activation. A typical apparatus for electrically igniting such flash units is disclosed in U.S. Pat. No. 3,319,547.

In order to obviate the necessity for an electrical activation system, an improved percussion-activatable flashlamp has been developed. A multilamp photoflash unit which uses such percussion-ignitable flashlamps is disclosed in my copending U.S. application Ser. No. 765,930, entitled "Multilamp Flash Unit." This flash unit comprises a package containing a plurality of percussion-ignitable photoflashlamps having individual reflectors. The lamp envelopes of this unit are located within a containing package and individual firing tubes extend from the bottom of each lamp envelope through openings in the package base to a location beneath the package for percussion by a separate striker outside the package.

The primer tubes of such percussion-ignitable flashlamps contain a percussion-activatable powder charge and are closed on their bottom end and open on their top end into the lamp envelope. When a primer tube of such units is struck by a separate percussion element located outside the package, the charge of percussion-sensitive material in the tube explodes and, in turn, ignites the flash-producing combustibles in the lamp envelope through the open end of the tube.

The flash units of the type disclosed in my aforementioned application require a percussion of considerable energy to ignite reliably their primer charges. As has been mentioned, this energy for percussion has heretofore been provided by percussion striker that is separate from the flash unit and has been energized by the normal, semiautomatic movements of the photographic apparatus on which the unit is mounted.

A disadvantage has been found to exist with respect to the above-described type of flash unit—actuating apparatus combination in that cocking or other wise energizing a striking element sufficiently to reliably fire a percussion primer, creates an overload to the normal movements of the photographic apparatus. A further disadvantage of this pervious arrangement is that means must be provided on the flash unit base and/or socket of a receiving apparatus to support the external primer tubes rigid with respect to the striking mechanism. This requirement for rigid support of the primer in turn present additional problems in providing a large zone within which tubes can be struck.

SUMMARY OF THE INVENTION

The present invention is addressed to the above-described problems and provides a percussion-activatable photoflash unit which has a preenergized striker element that is releasable for movement into percussion with a primer element of a flashlamp of the unit. One embodiment of my invention comprises a plurality of percussion-activatable lamps located inside the package in operative relation with individual preenergized striker elements, the package having access means for the separate release of each striker element. Therefore, it is considered a feature of the present invention to provide an individual striker on a percussion-activatable flash unit with the striker located for operative association to activate the flash unit. Another feature of the invention provides a plurality of such individual strikers associated with respective lamps on a multilamp unit.

The present invention also provides photographic apparatus which, in conjunction with the preenergized, percussion-activatable flash units described above, affords reliable percussion-flash activation, without the necessity of large energy output from normal operating movements of the apparatus. In accordance with this feature, the present invention comprises photographic apparatus having means for operatively receiving a photoflash unit having preenergized percussion strikers and means for cooperating with such received units to actuate release of the energized striking elements and effect percussion flash. A further feature of the present invention is the provision of a combined photographic unit having percussion-activatable flashlamps with individual preenergized strikers and means for operably receiving and selectively actuating the activation of lamps of the unit. In addition, the present invention provides apparatus for receiving selectively positioning and actuating in synchronization with a picture-taking operation, a unit of percussion-ignitable photoflashlamps with individual preenergized striker elements.

It is therefore an object of the present invention to provide a percussion-activatable photoflash unit with preenergized striking means.

It is another object of the present invention to provide an improved percussion-ignitable photoflash unit which substantially reduces the actuating energy output required from apparatus with which it is used.

Another basic object of the present invention is to provide a percussion-activatable flash unit with a striker mounted on the unit in operative relation with respect to the lamp.

Another object of the present invention is to provide an improved multilamp photoflash unit having a plurality of percussion-activatable flashlamps and individual preenergized percussion elements for each flashlamp.

Another object of the present invention is to provide an improved multilamp photoflash unit having a plurality of percussion-activatable flashlamps and individual percussion elements for each flashlamp.

Another object of the present invention is to provide photographic apparatus for use with percussion-activatable flash units having preenergized strikers.

Another object of the present invention is to provide photographic apparatus for effecting percussion flash and with a low output of flash actuating energy.

Another object of the present invention is to provide improved photographic apparatus for producing percussion-actuated photoflash.

Yet another object of the present invention is to provide apparatus to cooperate with percussion-activatable flash units, of the type having preenergized percussive elements, and selectively effect actuation of such units.

Still another object of the present invention is to provide a photographic camera adapted to receive and selectively actuate the activation of percussion-ignitable flash units with preenergized striking elements in synchronization with camera picture-taking operations.

DESCRIPTION OF THE DRAWINGS

The above and other objects and advantages will be apparent to one skilled in the art from the following description of preferred embodiments of the invention with reference to the accompanying drawings in which like numerals denote like characters and wherein:

FIG. 6 is a perspective view of a camera showing one embodiment of the actuating structure of the present invention, portions of the camera housing being removed and parts omitted for clarity of illustration;

FIG. 7 is a perspective view of the actuating elements shown in FIG. 6 when in a cocked position; and FIG. 8 is a top sectional view of a portion of the camera shown in FIG. 6 showing the socket-rotating mechanism of the camera.

DETAILED DESCRIPTION OF PREFERRED EMBODIMENTS

Figure 1:
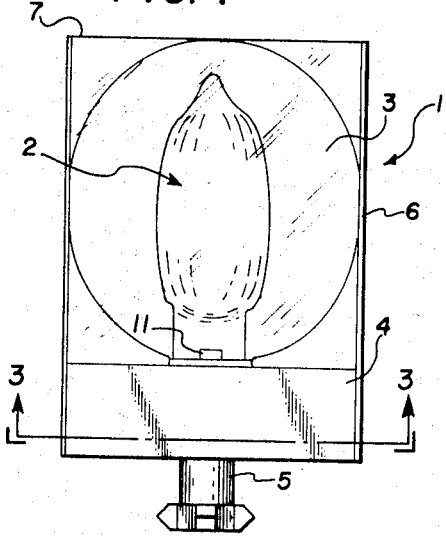
FIG. 1 is a front view of a multilamp photoflash unit embodying the present invention.
Figure 2:
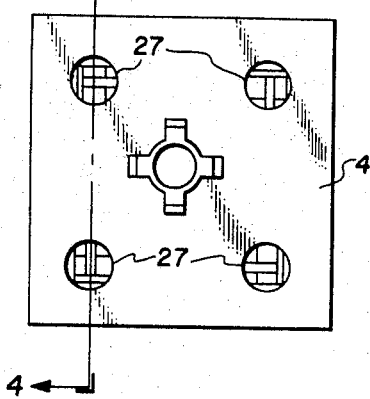
FIG. 2 is a bottom view of the unit shown in FIG. 1.

By referring to FIG. 1 and 2, one embodiment of a multilamp photoflash unit 1 embodying the present invention can be seen. The unit 1 includes a plurality of percussion-activatable flashlamps 2 which are mounted with their individual reflectors 3 on a base 4 of generally square cross section to form an assemblage which is generally square cross section to form an assemblage which is generally cubic in configuration. The base 4 can suitably be formed of molded plastic.

In FIGS. 1 and 2 it can be seen that a hollow post 5 extends from the bottom of the base 4 to provide means for releasably mounting the unit on photographic apparatus in a known manner. Transparent sidewall members 6 are desirably provided around the unit 1 and a top member 7 completes the package enclosure and can be used to support the individual reflectors 3 in proper reflecting alignment with their respective flashlamps 2.

Figure 4:
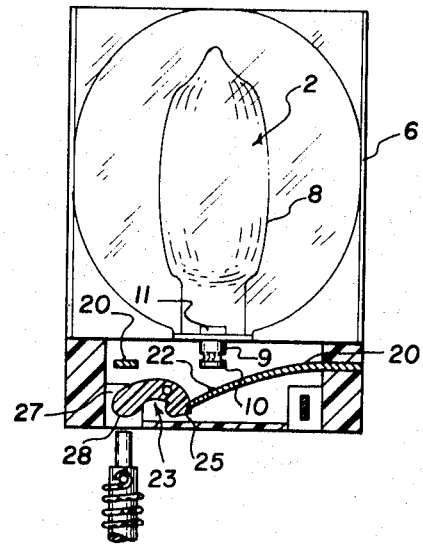
FIG. 4 is a sectional view of the multilamp photoflash unit shown in FIG. 1 taken along the line 4—4 indicated in FIG. 2 and showing a portion of an actuating mechanism for the photoflash unit.

By referring to FIG. 4 it can be seen that the individual lamps 2 are formed with a hermetically sealed envelope 8 which contains combustible material such as zirconium foil and a combustion-supporting gas such as oxygen. At the bottom of each lamp 2, a hollow primer tube 9 is provided, which suitably can be formed of metal. The primer tube 9 is closed at its bottom end forming a percussion cap 10 of known construction. The primer tube contains a charge of percussion-sensitive material, such as zirconium fulminate, or other known ballistic primer charges and is activated by deformation of the charge when the percussion cap 10 is struck with sufficient percussive energy. The tube 9 is open at its upper end 11 into the envelope 8 in a manner such that percussion activation of the powder charge in the primer tube will cause the combustible material in the envelope to ignite providing photographic flash.

Figure 3:
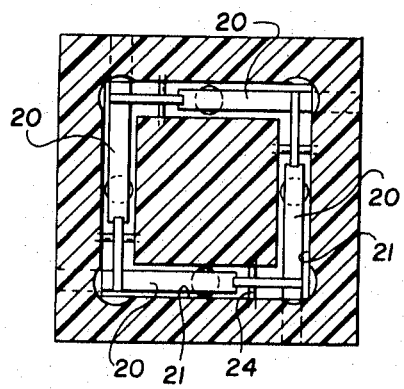
FIG. 3 is a sectional view of the multilamp photoflash unit shown in FIG. 1 taken along the lines 3—3.

Referring now to FIGS. 3 and 4 it can be seen that a plurality of spring members 20 are embedded at one end in cantilever fashion into the base 3 and extend in channels 21 formed in the base 3 so that the free end 22 of each of the members 20 is located beneath the percussion cap 10 of respective flashlamps 2, thereby providing an individual percussion striker for each lamp 2. It will be appreciated that the percussion cap 10 can be embedded rigidly into the base 3 or secured rigidly to the base 3 by known methods and extend into the channels 22 at suitable locations for percussion impact by spring strikers 20.

As can also be seen in FIGS. 3 and 4, the flash unit 1 is provided with a plurality striker holding members 23, which, in this embodiment, are formed as latch levers pivotally mounted on a pin 24. The members 23 are desirably constructed so that the center of gravity substantially corresponds to the pivot point and have a striker retaining notch 25. As can be seen most clearly in FIG. 4, the holding members 23 are located in channels 21 so as to be releasably engageable with the free ends 22 of strikers 20 when the strikers have been stressed to an energized position like that shown in FIG. 4, and in this condition are referred to as "preenergized."

Referring now to FIGS. 2 and 4, it can be seen that a plurality of access openings 27 are formed in the bottom of base 3, generally in alignment with actuating ends 28 of the holding members 23. The openings 27 extend into channels 21 so that the holding members 23 can be contacted on their ends 28 and pivoted clockwise, as viewed in FIG. 4, about the pin 24 by a suitable actuating member 72, when the actuating member is moved up into the access opening.

The spring members 20 of the flash unit 1 are intended to be stressed to and preset in the preenergized position until it is desired to activate their associated flashlamp 2. The strikers can be formed of spring wire or strips which can be of steel or other resilient materials having high-restoring forces.

Figure 5:
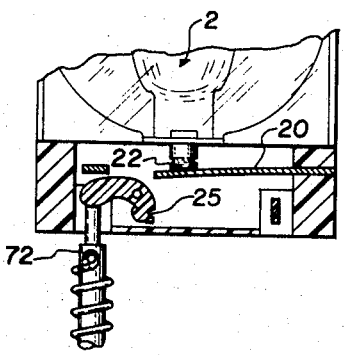
FIG. 5 is a partial sectional view similar to FIG. 4 but showing the unit after activation of one lamp.

It can be seen in FIGS. 4 and 5 that when an actuator member such as 72 is moved into an access opening 27 and pivots a holding member 23 clockwise, the notch 25 on that lever 23 moved downward and releases the energized striker 20 held by that member so that the restoring spring forces of the released striker cause its free end 22 to move into percussion contact with the cap 10 of the associated primer 9. Ignition of a lamp 2 associated with the released striker 23 is accomplished in the manner described above. It is to be pointed out that by suitable design of the cooperation of the holding member 23 and striker 20 such as is shown in FIG. 4, an additional energization can be provided to the striker 20 by providing for the holding member 23 to move the free end 22 of striker 20 downward before effecting release of the striker. Such an additional energization by the actuating member is not however required in order to achieve operable percussion.

In FIG. 5, the striker 20 and holding member 23 are shown in the released positions after activation of the percussion-ignitable flashlamp 2.

It will be appreciated individual striker elements of the present invention need not take the specific form illustrated but can be any biased element which can be releasably retained within the flash unit in a preenergized condition and which, upon release, will effect percussion activation of an associated flashlamp.

It also is to be noted that the striker and holding elements need not be enclosed in the flash unit in the specific manner shown herein; however, it is very desirable that such elements be protected by structure of the unit in such a fashion that accidental firing is not likely. For this purpose, easily rupturable protective structure can be provided to prevent accidental activation of the holding elements. In accordance with the present invention, it only is necessary that the unit be provided with actuating sites with which an actuator member of a photographic apparatus can cooperate to effect release of a preenergized striker element.

It will also be appreciated that the present invention can be utilized with flash units having any number of flashlamps in that a corresponding number of individual preenergized striker elements can be provided for any number of flashlamps in the unit.

Referring now to FIGS. 6–8 one embodiment of photographic apparatus which, according to the present invention, is provided for selectively actuating release of preenergized striker elements in a flash unit such as that in FIGS. 1–5, will be described.

In FIG. 6, the actuating apparatus of the present invention is shown as it can be embodied in a photographic camera 40.

Because photographic cameras having structure to receive and sequentially index electrically ignitable multilamp photoflash units are generally known, the present description will be directed to particular elements of such cameras which cooperate more directly with the present invention, elements not specifically shown or described herein being understood to be selectable from those known in the art.

The camera 40 comprises an exterior housing 41 and an interior frame 42 on which various operating elements of the camera are mounted. In FIG. 6 it can be seen that a socket 43, of a known type adapted to detachably receive and support a flash unit with a base 3 such as is shown in FIG. 1, is provided in an opening on the top of housing 41.

In FIG. 6 it can be seen that the camera 40 has a film advance wheel 45 with an operating lever 46, the wheel 45 being connected to a film-drive shaft 47 which successively advances photographic film inserted in the camera in a known manner. The wheel 45 also has a lug 48 formed on its periphery, the purpose of which will be subsequently described.

A shutter release lever 50 is slidably mounted on pins 51 for movement in a vertical direction and is urged upwardly by shutter release spring 52. In FIG. 6 it can be seen that the shutter release lever includes an operating top 55 and has extending horizontally therefrom a retaining arm 53 which terminates in a shutter release latch 54.

A shutter driver 60 is mounted in the camera on suitable means (not shown) for rotation on pin 61 in operative association with the shutter release latch 54 and the camera shutter (not shown). The shutter driver is biased by shutter drive spring 62 for rotation in a counterclockwise direction as viewed from the top in FIG. 6 and includes a cocking arm 63, shutter actuating arm 64 and retaining arm 65 which will be further described hereafter.

An actuating plunger 70 is slidably mounted in a bore in the frame 42 of the camera and urged upwardly by an actuating spring 71 so that, when released from its cocked position, an actuating pin 72 on the upper end of plunger 70 will pass through an actuating opening 73 in the camera top. The actuating opening 73 and plunger 70 are aligned with respect to socket 43 so that the access opening 27 associated with a forwardly facing lamp 2 of a percussion-ignitable unit such as disclosed in FIGS. 1–5, will be aligned with these elements when in the socket 43. The actuating plunger 70 has a cocking pin 76 and a retaining notch 75 formed on the bottom end thereof at a location for cocked engagement by retaining arm 65 of shutter driver 60.

A cocking slider 80 is mounted for horizontal movement in the camera by means not shown and has an opening 81 engaged by lug 48 of film advance wheel 45. The slider 80 includes a shutter driver cocking arm 82 and a ramped end 83 adapted to contact cocking pin 76 and move plunger 70 downwardly against spring 71.

In FIG. 6 the parts of the camera are shown during a picture-taking operation with shutter release lever 50 partially depressed; whereas in FIG. 7 the parts are shown in a cocked position after film wind and ready for a picture-taking operation.

By referring to FIGS 6 and 7 it can be seen that when the camera is in the ready condition shown in FIG. 7 and shutter release lever 50 is depressed, the shutter release latch 54 releases shutter driver 60 so that arm 64 can move counterclockwise to actuate the camera shutter (not shown) in a known manner. This movement of the released shutter driver 60 also causes retaining arm 65 to release actuating plunger 70 so that the actuating pin 72 is moved upwardly through the actuating opening 73 and into the aligned access opening 27 of an inserted flash unit 1. This action releases the individual spring 20 which is associated with the forwardly facing flashlamp 2 and provides photoflash in synchronization with the camera shutter.

During film advance, the film advance wheel 45 is rotated counterclockwise causing slider 80 to move right to the position indicated by the dotted lines in FIG. 7. Rightward movement of the slider 80 causes ramped end 83 of the slider to contact pin 76 and move the actuator plunger 70 downward. Also during this rightward movement the shutter driver cocking arm 82 engages and moves the shutter driver clockwise against spring 62 and over shutter release latch 54 to its cocked position. The final stages of clockwise rotation of the shutter driver 60 causes its retaining arm 65 to move into notch 75 of the lowered plunger 70 thereby retaining the plunger in the cocked position. After the film advance wheel 45 has been returned to its original position shown in FIG. 7 the camera elements are cocked and ready for another picture-taking operation.

By referring to FIGS. 6 and 8, the mechanism of the present invention which provides socket rotation in proper cooperation with film advance and the cocking of actuating plunger 70 can be seen.

As shown in FIG. 6, the slider 80 has formed thereon an upper arm 85 which is pinned to a socket rotating arm 86 that can be more clearly seen in FIG. 8. As shown in FIG. 8, a spring 87 urges socket-rotating arm 86 towards slider 80 and against a stop 88 on upper arm 85. The rotating arm has a claw 89 formed on its forward end that is adapted to engage ears 91 which are formed on the lower portion of socket 43.

It can be seen that during film advance the slider 80 first cocks plunger 70 thereby withdrawing the pin 72 from an inserted flash unit and moved rotating arm into contact with an ear 91 on socket 43 as indicated by the dotted position a in FIG. 8. Further movement of the slider to dotted position 6 effects rotation of the socket 43 with the pin 72 out of an interfering position. The socket is indexed and held in the advanced position by engagement with a spring loaded detent 92 in notches 93 of the socket 43.

The invention has been described in detail with particular reference to preferred embodiments thereof but it will be understood that variations and modifications can be effected within the spirit and scope of the invention.

We claim:

1. A photoflash unit comprising:
   a container having a transparent side; at least one percussion-activatable photoflashlamp mounted in said container in alignment with said transparent side;
   reflecting means located in said container on the opposite side of said lamp from said transparent side for reflecting light emitted from said lamp through said transparent side; spring means enclosed completely within said container for preventing inadvertent actuation of said spring means and being in operative relation with said lamp for striking said lamp with activating percussion: and means located completely within said container for holding said spring means away from said lamp with said spring means in an energized condition.

2. The combination of claim 1 wherein said holding means comprises a latch.

3. The combination of claim 1 wherein said container is provided with an aperture therein in the proximity of said holding means for providing access from the exterior of said container to release said spring means from said holding means.

4. In a multilamp photoflash unit of the type having a plurality of flashlamps and individual lamp reflectors located within and in operative relation about the central axis of a container, the improvement comprising:
   a. a plurality of percussion-activatable elements located within said container, each element being operatively associated with a flash lamp in said container;
   b. a plurality of striker elements enclosed completely within said container, for preventing inadvertent actuation of said elements said striker elements being located respectively in operative relationship with said percussion-activatable elements; and individual means located completely within said container for holding each of said striker elements in a preenergized condition spaced from its respective percussion-activatable element.

5. The combination of claim 4 wherein said container is provided with an aperture therein in the proximity of each of said individual holding means for providing access from the exterior to a location within said container to selectively release each of said striker elements from its respective holding means.